M. E. AUSTIN AND E. B. HOFFMAN.
TRACTOR WHEEL.
APPLICATION FILED APR. 25, 1921.
1,405,252.
Patented Jan. 31, 1922.
2 SHEETS—SHEET 1.
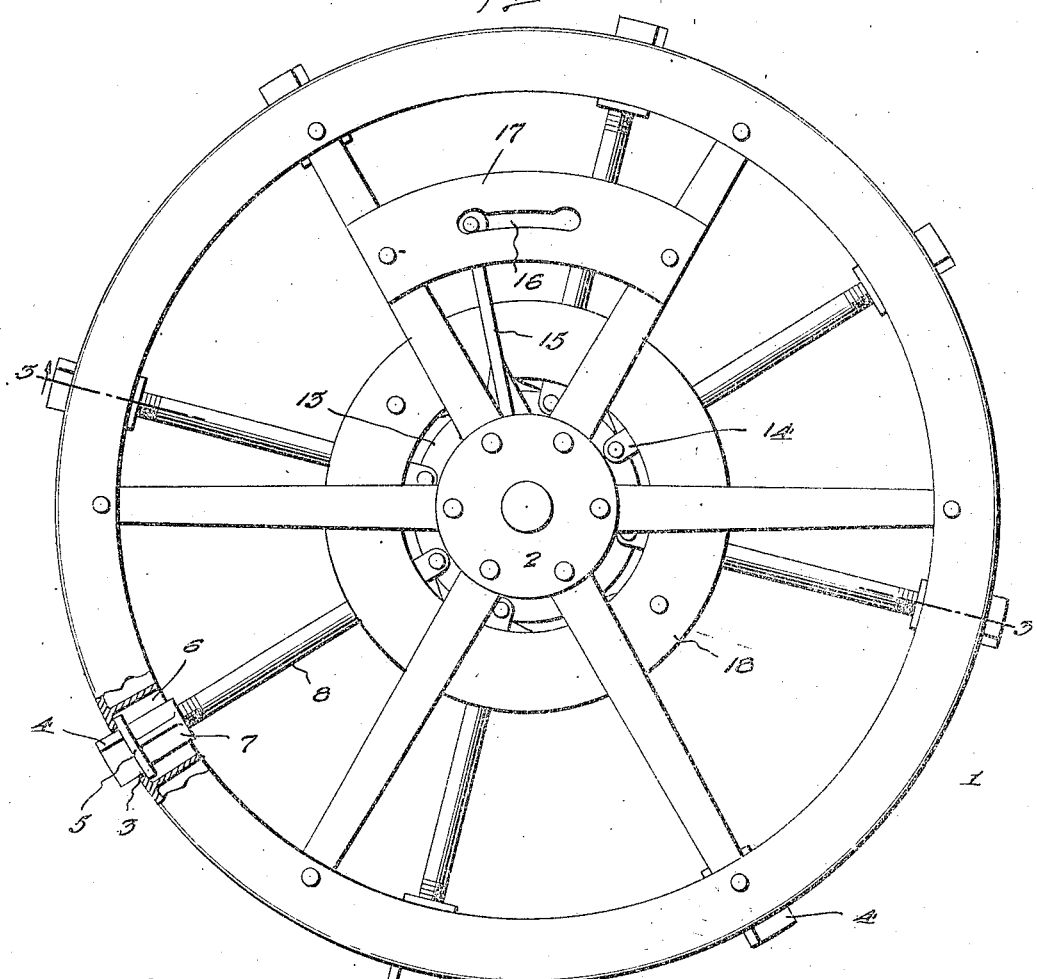
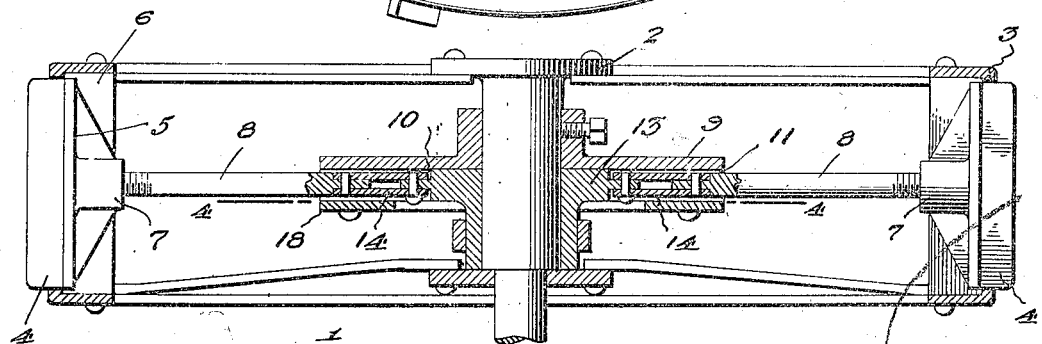
E. B. Hoffman
M. E. Austin
INVENTORS
BY Victor J. Evans
ATTORNEY
WITNESS:

M. E. AUSTIN AND E. B. HOFFMAN.
TRACTOR WHEEL.
APPLICATION FILED APR. 25, 1921.
1,405,252
Patented Jan. 31, 1922.
2 SHEETS—SHEET 2.
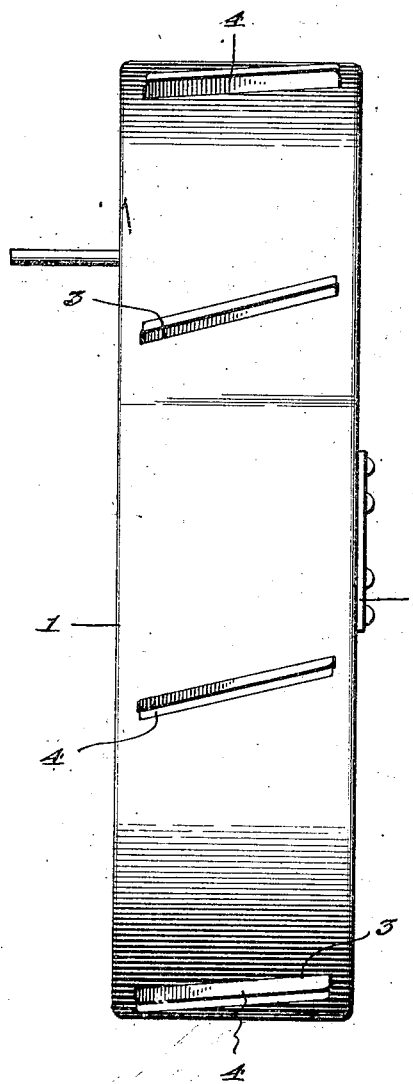
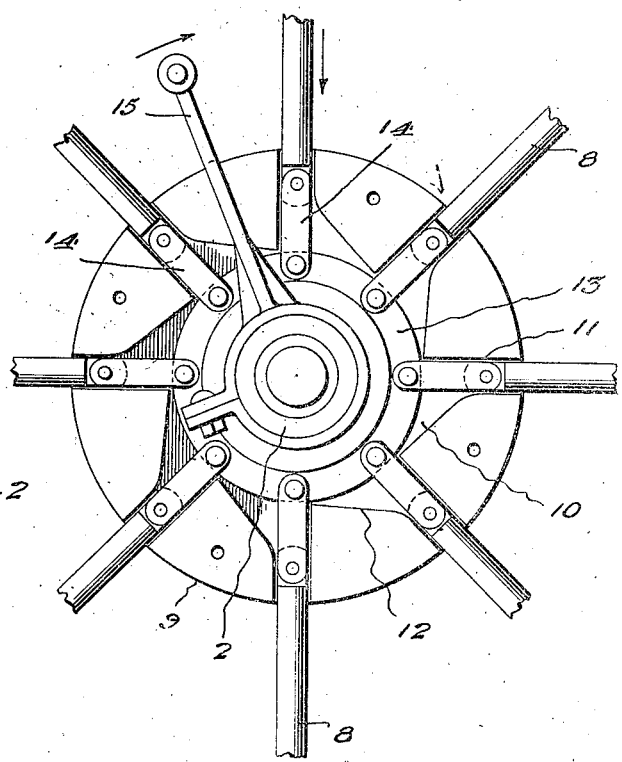
E. B. Hoffman
M. E. Austin
INVENTORS
BY Victor J. Evans
ATTORNEY

UNITED STATES PATENT OFFICE.

MARCUS EUGENE AUSTIN AND EDWARD B. HOFFMAN, OF DETROIT, MICHIGAN, ASSIGNORS OF ONE-HALF TO JOSEPH S. HOFFMAN, OF MONROE, MICHIGAN.

TRACTOR WHEEL.

1,405,252.      Specification of Letters Patent.      Patented Jan. 31, 1922.

Application filed April 25, 1921. Serial No. 464,212.

*To all whom it may concern:*

Be it known that we, MARCUS EUGENE AUSTIN and EDWARD B. HOFFMAN, citizens of the United States, residing at Detroit, in the county of Wayne and State of Michigan, have invented new and useful Improvements in Tractor Wheels, of which the following is a specification.

This invention relates to improvements in tractor wheels, the principal object of the invention being to provide means for moving the mud lugs within the periphery of the wheel when the tractor is traveling over good roads and the use of such lugs is unnecessary and undesirable.

Another object of the invention is to provide manually operated means whereby all the lugs of each wheel can be moved into operative or inoperative position simultaneously.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a side view of a wheel made in accordance with our invention.

Figure 2 is an edge view of Figure 1.

Figure 3 is a section on line 3—3 of Figure 1.

Figure 4 is a section on line 4—4 of Figure 3.

In these views the wheel is shown at 1 and its hub at 2. Inclined slots 3 are formed in the wheel rim through which project the mud lugs 4 for providing traction for the wheel in passing over soft surfaces. In passing over good roads such lugs are not necessary and are undesirable for the reason that they damage the road surface. We therefore make these lugs movable so that they can be moved inwardly with their outer edges flush with the circumference of the wheel.

In carrying out our invention we form each lug upon a plate 5 which is movably mounted in a recess or chamber 6 formed on the inner face of the wheel rim. Each plate is provided with a screw threaded socket 7 to receive the radiating rods 8. An annular plate 9 surrounds the hub of the wheel and is suitably secured thereto. This plate is provided in one face with an annular recess 10 and with grooves 11 radiating from the recess and extending through the outer periphery of the plate. These grooves each have one of their walls cut away adjacent its inner end to provide the inclined part 12. The rods 8 have their inner ends engaging the grooves and a ring 13 is located in recess 10 and is connected with the inner ends of the rods by the links 14. A handle member 15 is secured to the ring and the crank of the handle member passes through a slot 16 in plate 17 which is secured to the wheel. The slot 16 is of sufficient length to permit the handle member to be manually operated a sufficient degree to partially rotate the ring and thus cause it through the links 4 to move the rods inwardly and outwardly and thus cause the lugs to assume an operative or inoperative position with respect to the ring. A cover plate 18 is bolted to plate 9 to cover the actuating parts therein.

The inclined parts 12 being engaged by the links will limit the movement of the parts in one direction while the straight part of the walls of the grooves being engaged by the links will limit the movement of the parts in the other direction.

From the above it will be apparent that the lugs can be easily and quickly thrown into operative position whenever necessary so that they will provide traction while the apparatus is passing over soft places in the road or over a field but as soon as a good part of the road is struck or the device is traveling along a good road the parts are moved in the opposite direction to retract the lugs so that a smooth tread is presented to the road surface and thus no damage to the surface will be done by the projecting lugs.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A wheel having movable mud lugs thereon, a plate attached to the wheel hub having an annular recess and radiating grooves therein, rods having their outer ends connected with the lugs and their inner ends located in the grooves, a ring rotatably mounted in the recess, links connecting the ring with the inner ends of the rods and a handle member connected with the ring for manually rotating the same.

In testimony whereof we affix our signatures.

MARCUS EUGENE AUSTIN.
EDWARD B. HOFFMAN.